US011203956B2

(12) United States Patent
Brulin et al.

(10) Patent No.: US 11,203,956 B2
(45) Date of Patent: Dec. 21, 2021

(54) VALVE

(71) Applicant: WOCO Industrietechnik GmbH, Bad Soden-Salmünster (DE)

(72) Inventors: Franz-Josef Brulin, Bad Soden-Salmünster (DE); Torsten Hofmann, Bad Soden-Salmünster (DE); Ralf Möller, Schlüchtern (DE); Zsolt Mosonyi, Würzburg (DE)

(73) Assignee: Woco Industrietechnik GmbH, Bad Soden-Saimunster (DE)

( * ) Notice: Subject to any disclaimer, the term of this patent is extended or adjusted under 35 U.S.C. 154(b) by 0 days.

(21) Appl. No.: 15/670,813

(22) Filed: Aug. 7, 2017

(65) Prior Publication Data
US 2018/0038506 A1 Feb. 8, 2018

(30) Foreign Application Priority Data

Aug. 8, 2016 (DE) ...................... 20 2016 104 363.8

(51) Int. Cl.
*F01M 13/04* (2006.01)
*F16K 31/42* (2006.01)
*F01M 13/00* (2006.01)
*F16K 31/34* (2006.01)
(Continued)

(52) U.S. Cl.
CPC ........ *F01M 13/04* (2013.01); *F01M 13/0011* (2013.01); *F16K 31/34* (2013.01); *F16K 31/42* (2013.01); *F01M 2013/0022* (2013.01); *F01M 2013/0433* (2013.01); *F02B 37/16* (2013.01); *F16K 31/1221* (2013.01); *F16K 31/1226* (2013.01)

(58) Field of Classification Search
CPC ...... F16K 31/34; F16K 31/42; F16K 31/1221; F16K 31/1226; F16K 47/04; F01M 13/04; F01M 13/0011; F01M 2013/0433; F01M 2013/0022; F02B 37/16
USPC ........................................ 55/385.3, 447–461
See application file for complete search history.

(56) References Cited

U.S. PATENT DOCUMENTS 2,202,164 A * 5/1940 Pascale .................. B01D 45/08
55/417
5,012,841 A * 5/1991 Kueffer ................... F16K 47/04
137/625.39
(Continued)

FOREIGN PATENT DOCUMENTS

DE      102006024816 A1 * 12/2007 ........... F01M 13/021
DE   10 2011 052 132          1/2013
(Continued)

OTHER PUBLICATIONS

DE-102006024816, Dec. 2007, English Langauge Machine Translation (Year: 2007).*

*Primary Examiner* — Patrick Hamo
*Assistant Examiner* — Wesley G Harris
(74) *Attorney, Agent, or Firm* — Crowell & Moring LLP

(57) ABSTRACT

A valve for controlling at least one first flow of at least one fluid, in particular, within a motor vehicle, along a first fluid path from at least one valve inlet to at least one valve outlet, comprising at least one valve seat that is arranged—with regard to the fluid flow—between the valve inlet and the valve outlet, wherein the valve seat can be closed at least in some regions in at least one closed position by means of at least one valve member.

15 Claims, 5 Drawing Sheets

(51) Int. Cl.
*F02B 37/16* (2006.01)
*F16K 31/122* (2006.01)

(56) References Cited

U.S. PATENT DOCUMENTS

| | | | | |
|---|---|---|---|---|
| 8,783,647 B2 * | 7/2014 | Medina | ............... | F16K 31/1223 |
| | | | | 251/282 |
| 8,863,776 B2 * | 10/2014 | Grace | ..................... | F16K 47/08 |
| | | | | 137/625.3 |
| 8,893,688 B2 * | 11/2014 | Ruppel | ................ | F01M 13/023 |
| | | | | 123/573 |
| 2009/0193770 A1 * | 8/2009 | Holzmann | .............. | B01D 45/06 |
| | | | | 55/318 |
| 2012/0285546 A1 * | 11/2012 | Ter Haar | ................. | F16K 47/08 |
| | | | | 137/12 |
| 2019/0178401 A1 * | 6/2019 | Zaggl | ................. | F16K 17/0453 |

FOREIGN PATENT DOCUMENTS

| | | | | |
|---|---|---|---|---|
| DE | 20 2014 103 750 | | 12/2015 | |
| EP | 2557344 A1 * | 2/2013 | ............ | F02B 37/183 |
| JP | 2008281211 A * | 11/2008 | ............. | F16K 47/04 |
| WO | WO-2009027912 A1 * | 3/2009 | ............. | F16K 47/08 |

\* cited by examiner

VALVE

CROSS REFERENCE TO RELATED APPLICATION

This application claims priority to German Application No. 20 2016 104 363.8, filed on Aug. 8, 2016. This application, in its entirety, is incorporated herein by reference.

FIELD OF THE DISCLOSURE

The present invention relates to a valve for controlling at least one first flow of at least one fluid, in particular, within a motor vehicle, along a first fluid path from at least one valve inlet to at least one valve outlet, comprising at least one valve seat that is arranged—with regard to the fluid flow—between the valve inlet and the valve outlet, wherein the valve seat can be closed at least in some regions in at least one closed position by means of at least one valve member.

BACKGROUND

A variety of valves, in particular, overrun air recirculation valves, are known from the prior art. For example, DE 10 2011 052 132 B1 from the applicant discloses such an overrun air recirculation valve. It is proposed to have the overrun air recirculation valve comprise a pneumatic actuator that is controlled via a three-way electromagnetic valve encompassed by the overrun air recirculation valve. In particular, it is proposed to integrate, into a valve member, a so-called B2 line that is used to pass on, to the three-way control valve, a fluid pressure that prevails in the region of the valve inlet.

DE 20 2014 103 750 U1 from the applicant also discloses such an overrun air recirculation valve. In this overrun air recirculation valve, a supply line is run to the three-way solenoid valve through a valve member in the form of a piston. It is also proposed to have a control chamber be sealed off from the valve chamber by a sealing element that is pretensioned by means of a spring element, by means of which the valve member is forced into a predetermined position, in particular, a closed position.

The basic functioning of this overrun air recirculation valve is depicted in FIGS. 1a and 1b. The overrun air recirculation valve 1 comprises a pneumatic valve 3 and an electromagnetic control valve 5, which is configured as a three-way valve. A valve seat 9 can be closed by means of a valve member 7 that is configured as a piston. FIG. 1a depicts the overrun air recirculation valve in the closed position. In this closed position, the control valve 5 is not energized, and causes a pressure adjacent to the valve inlet 11 to be applied to a control chamber 13 from a B2 line 12 through the control valve 5. The pressure then prevailing in the control chamber 13 causes the valve member 7 to be forced in the direction of the valve seat 9 due to the pressure prevailing in the control chamber 13 as well as to a force exerted by spring element 15, so that a connection between the valve inlet 11 and the valve outlet 17 is closed.

FIG. 1b illustrates the overrun air recirculation valve in an opened position. The solenoid valve 5 is now energized and causes the pressure prevailing in the control chamber 13 to be able to dissipate via a line 18 into the region of the valve outlet 17. At the same time, a connection of the valve inlet 11 or the B2 line 12 to the control chamber 13 is closed by means of the control valve 5. This causes the valve member 7 to move in the upward direction in FIG. 1a or 1b, against the force of the spring element 15, due to the adjacent fluid pressures, thus releasing the valve seat 9. A connection between the valve inlet 11 and the valve outlet 17 is thus released.

The overrun air recirculation valves described above have proven a success, in principle. It has, however, been shown that high temperatures may result in fixation of movable parts, in particular, the valve member or the control valve, thus producing a malfunction.

The present invention therefore addresses the problem of further developing the generic valve so as to overcome the drawbacks of the prior art are, in particular, to avoid malfunctions of the valve.

SUMMARY

This problem is solved according to the present invention in that the valve comprises at least one separation device, which is configured at least in some regions in the valve seat and/or in the valve member, in order to separate out stains present in the fluid, wherein the fluid can be guided in the closed position along at least one second fluid path from the valve inlet to at least one other valve device, and the separation device is arranged at least in some regions in the second fluid path.

Then, for the valve, it is proposed to have the second fluid path run at least in some regions through the valve member and/or the valve seat.

It is also preferred that the valve device comprise at least in some regions at least one valve chamber, at least one control chamber, at least one control valve, at least one auxiliary valve, at least one three-way valve, at least one bypass line (in particular, fluidically connected to the valve outlet), at least one connection line (such as a B2 line), and/or at least one solenoid valve.

A valve according to the present invention may also be characterized in that the separation device is configured at least in some regions as at least one insert that can be accommodated at least in some regions in the valve seat and/or the valve member and/or can be fixed, preferably by means of bonding, welding, clipping, latching, bolting, clamping, or positive and/or non-positive locking connection.

It is also proposed, with the present invention, that the separation device comprise at least one inflow device for the inflow of the fluid to be cleansed into the separation device, at least one outflow device for the outflow of the at least partially cleansed fluid from the separation device, and/or at least one discharge device for discharging stains that have been separated out from the fluid to be cleansed, wherein preferably at least the inflow device and the discharge device are configured at least in some regions as a single piece.

It is also proposed, with the present invention, that at least one centrifugal separation device, at least one swirl separation device, at least one baffle plate separation device, at least one labyrinth separation device, at/or at least one cyclonic separation device be provided, preferably comprised by the separation device, in particular, arranged at least in some regions between the inflow device and the outflow device, and/or operatively connected to the separation device, in particular, fluidically connected to the separation device.

In the two aforementioned embodiments, it is especially preferred for comprising at least one elevation surrounds the inflow device at least in some regions.

A valve according to the present invention may also be characterized by at least one connection line between the inflow device and the outflow device, wherein, in particular, the connection line forces at least one deflection on the fluid, the connection line having different cross-sections and/or cross-sectional shapes, the cross-section in the region of a deflection preferably being reduced in comparison to a region upstream and/or downstream of the deflection, wherein the change in cross-section is preferably continuous.

It is also proposed, with the present invention, that the discharge device comprise at least one discharge line, wherein the discharge line runs at least in some regions inclined in the direction of gravity, the discharge line is comprised by and/or formed of the connection line, at least in some regions, and/or the discharge line is connected at least in some regions to the inflow device and/or to the valve inlet.

A valve according to the present invention may also be characterized by a plurality of inflow devices, outflow devices, connection lines, discharge devices, and/or discharge lines, wherein, in particular, a plurality of inflow devices open into at least one outflow device, at least one connection line, at least one discharge device, and/or at least one discharge line, and/or at least one inflow device and/or at least one connection line open(s) into a plurality of outflow devices, discharge devices, and/or discharge lines.

Finally, for the valve, it is proposed that the valve be configured as an, in particular, electrical and/or pilot-operated overrun air recirculation valve.

The present invention is therefore based on the inventor's surprising findings that malfunctions can be traced to when, due to the connection of the valve inlet via the B2 line and the control valve in the closed state of the overrun air recirculation valve, fluid containing stains in particular, blow-by-containing contaminated fluid is able to flow through the B2 line and the control valve into the control chamber, wherein this contaminated fluid then flows into the region of the valve outlet when the valve is opened, so that the contaminated fluid is substantially passed through the entire overrun air recirculation valve, even if the overrun air recirculation valve is in the closed position. In other words, it was recognized that when the first fluid path through the direction of flow is closed, stains in particular, permanent ones may occur through the second fluid path, which deviates away at least in some regions from the first fluid path. The stains contained in the fluid may lead to deposits in the interior of the valve, primarily in the stroke range of the valve member and in the region of the control valve or solenoid valve, and the deposited fouling may then lead, in particular, to sooting or coking of these regions of the overrun air recirculation valve. It was thus also recognized that the failure safety of the generic valve can be increased by putting a stop to the penetration of fouling into the valve by arranging, in the region of the valve seat or valve member, a separation device that—even in the closed state of the valve—causes fluid penetrating into the valve to be cleansed of stains. This prevents contaminated fluid—in particular, blow-by-containing fluid—from being able to penetrate into the interior of the overrun air recirculation valve and leading there to deposits and fouling that could, at high temperatures, lead straight to unwanted sooting or coking of the valve.

In especially preferred embodiments, the separation device is integrated into the valve member. Preferably, the separation device is manufactured as a separate component and used as an insert into a receptacle of the valve member or valve seat. Preferably, this connection to the valve member is provided by means of welding or of positive and/or non-positive locking connecting of the insert to the valve member, e.g., via a latched connection.

The separation device may be based on a variety of different mechanisms of action. For example, a labyrinth system may be provided through the separation device, wherein stains are—in particular, due to the inertia thereof in the separation out—separated out due to a deflection, in particular, multiple deflection of the fluid. Alternatively or in addition, the separating out may be achieved, increased, and/or supported by a cyclone effect. Then, the fluid is allowed to flow in tangentially and is set in rotation, in order to separate out the particles or stains by means of centrifugal forces. For this purpose, the separation device preferably comprises an inflow device in the form of an opening facing the valve inlet or valve seat. From this inflow device, the fluid is discharged through a connection line to an outflow device, in particular, an opening, that faces the valve member and/or the interior of the valve. The connection lines may have different cross-sections, e.g., round, oval, polygonal, or the like.

Especially preferably, the connection lines have a cross-sectional or channel narrowing in the region of the deflection. This accelerates the flow in this region, thus making it possible to achieve the greatest available separation.

It is also preferable for the cross-section of the connection line to increase after the exit from the deflection, in order to thus calm the flow of the fluid to be cleansed and achieve a reduction in the pressure loss. The cross-section preferably changes continuously, i.e., there are smooth transitions between the separation region in the region of the deflection and the calming region adjoining the deflection.

The stains, particles, and, in particular, liquid particle such as oil that are separated out in the deflection region may optionally be discharged out of the separation device via an isolated discharge device. It is, however, especially efficient when the discharge device is configured at least in some regions as a single piece with the connection line. Thus, the connection line may, for example, rise against the direction of gravity, so that elements that have been separated out can flow out in the lower region of the connection therein against the direction of flow of the fluid. In particular, the separated-out stains are thus supplied back to the valve inlet.

The path of the connection lines in the separation device is not, however, limited to being such a partially-vertical path. The separation geometry may also be arranged horizontally or on a slope, in particular, along a zig-zag direction in a horizontal or vertical plane. A suitable geometry is selected, in particular, in accordance with the installation space of the valve, in particular, in a vehicle, in order to adapt the slope and geometry of the discharge device so as to ensure optimal discharging of the stains.

However, the separation device is not limited to being configured as a labyrinth separator. Thus, the separation device also makes it possible to induce a rotational movement in the fluid to be cleansed, so as to produce separation due to the resulting centrifugal forces. It may then be provided that the connection lines of the separation device are configured so that the fluid to be cleansed discharges the separation device into a substantially cylindrical space, wherein the fluid is introduced into this space in a circular direction. This causes the stains to be separated out and then flow back into the separation device and there be returned, via the discharge device, in particular, into the region of the valve inlet. Alternatively, it may be provided that the stains are discharged into the region of the valve outlet.

In order to actively prevent staining of the separation device, it is, in particular, provided that an elevation is provided in the region of the inflow device. This elevation or raised geometry in the region of the inflow device makes it possible to reduce the amount of stains penetrating into the separation device, thus reducing the amount of stains separated out, in particular, in the first deflection or baffle region. Otherwise, there could also be deposition of stains in the region of the separation device and, consequently, coking or sooting.

BRIEF DESCRIPTION OF THE DRAWINGS

Other features and advantages of the present invention arise from the following description, which describes preferred embodiments of the present invention with reference to schematic drawings.

In the drawings,

FIG. 2b illustrates a view of the separation device of the valve of FIG. 2a;

DETAILED DESCRIPTION

Figure 1A:
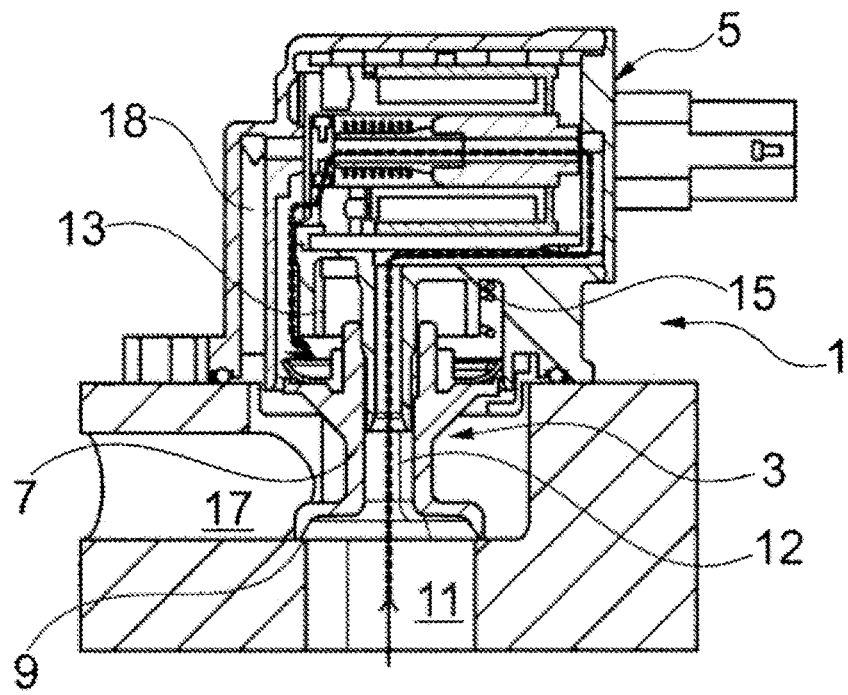
FIG. 1a illustrates a schematic cross-sectional view of a generic valve in a closed position.
Figure 1B:
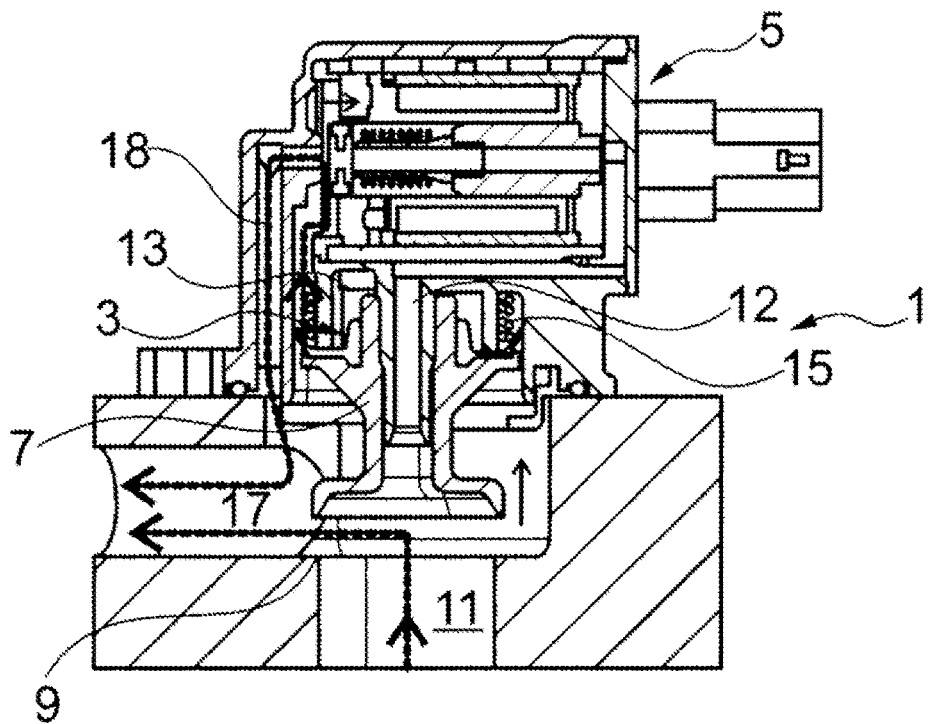
FIG. 1b illustrates the valve of FIG. 1a in the open position.
Figure 2A:
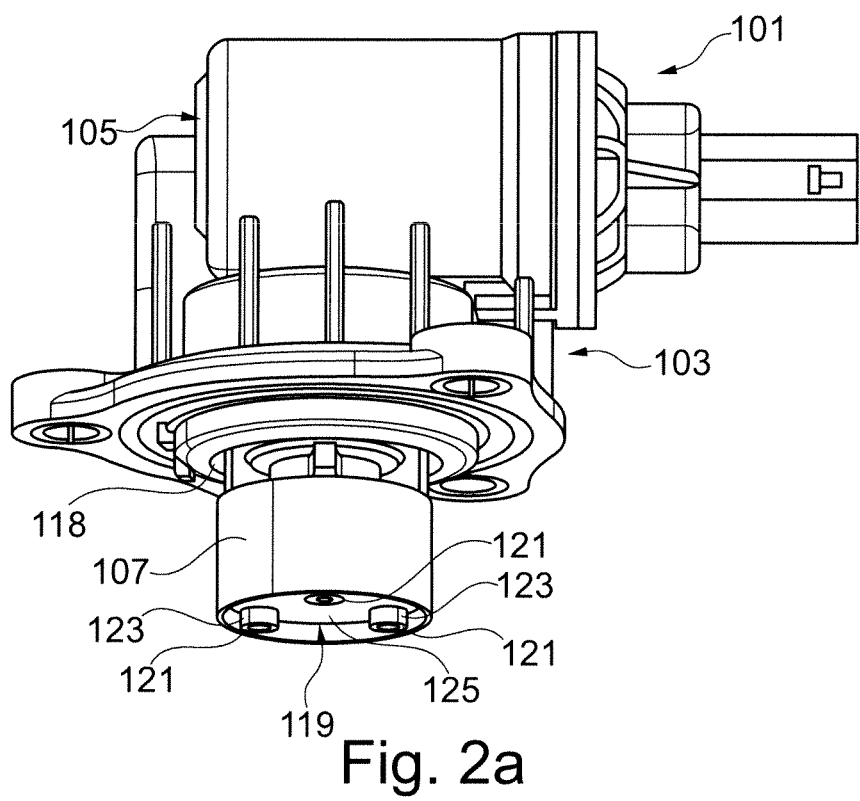
FIG. 2a illustrates a perspective view of an overrun air recirculation valve according to the present invention.

FIG. 2a illustrates a perspective view of an overrun air recirculation valve 101. Those elements of the overrun air recirculation valve 101 that correspond to those of the overrun air recirculation valve 1 bear the same reference signs, but increased by 100. As can be seen, in particular, in FIG. 2a, a separation device 119 in the form of an insert having a labyrinth system is arranged in the region of the valve member 107, in particular, in an open space of the piston.

The separation device 119 comprises a total of three inflow devices 121. Elevations 123 are arranged in the region of the inflow device 121. The elevations 123 causes already a reduction in the amount of stains supplied to the separation device 119, because much of the stains crashes into the intermediate region 125 between the inflow device 121 and is separated out there so as to then flow back into the valve inlet region. As can be seen, in particular, in FIG. 2b, the inflow devices 121 open into connection lines 127, which in turn open into an outflow device 129.

Figure 2B:
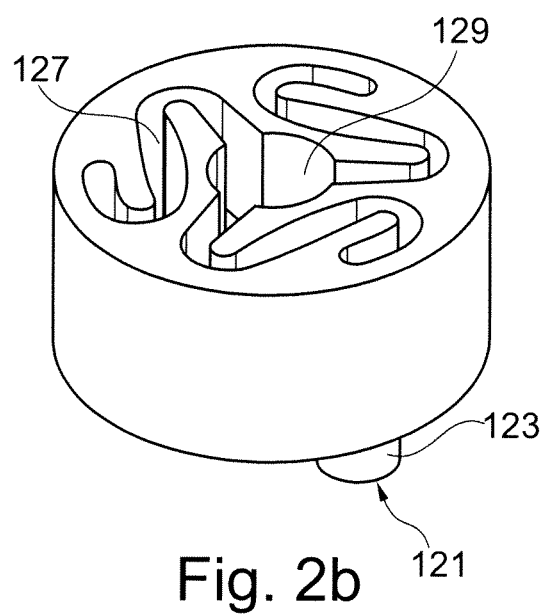
Figure 3:
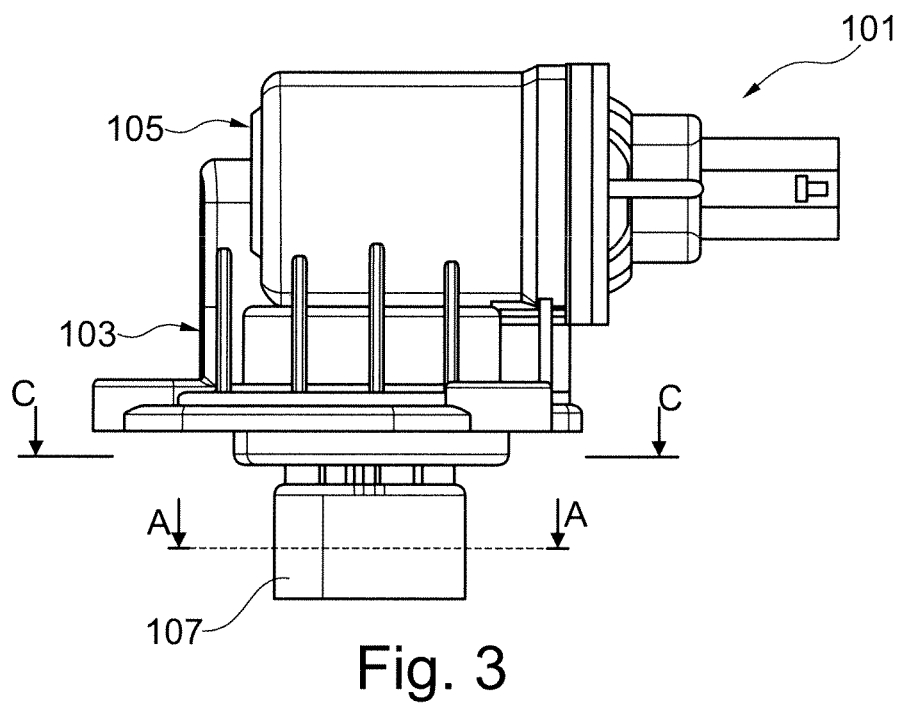
FIG. 3 illustrates a side view of the overrun air recirculation valve of FIGS. 2a and 2b.

FIG. 3 depicts a side view of the overrun air recirculation valve 101 of FIGS. 2a and 2b. As can be seen, in particular, in FIG. 3, the separation device 119 is entirely accommodated within the valve member 107.

Figure 4:
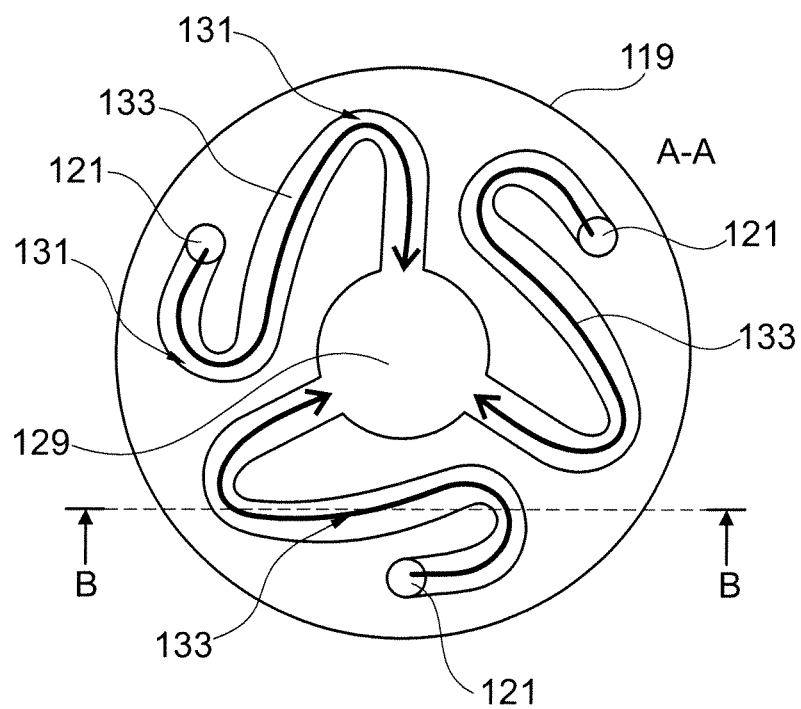
FIG. 4 illustrates a cross-sectional view from a direction A of FIG. 3.

FIG. 4 depicts a cross-sectional view from the direction A in FIG. 3. As can be seen in FIG. 4, the connection lines 127 each comprise two deflections 131. Starting from the inflow device 121, first the cross-section of the connection line decreases in the region from the inflow device 121 to the deflection 131. Thus, the connection line 127 has a reduced cross-section in the region of the deflection 131, causing the fluid to accelerate in this region and raising the degree of separation.

Figure 5:
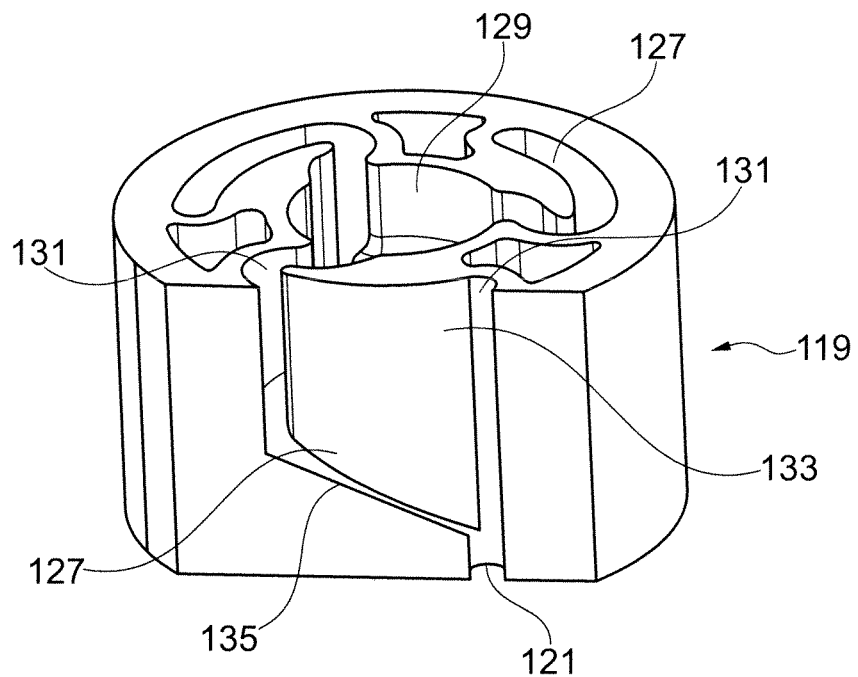
FIG. 5 illustrates a sectional view of the separation device of FIG. 4, from a direction B in FIG. 4.

After passage through the deflection, the fluid enters an intermediate region 133 in which the cross-section is enlarged in comparison to the deflection 131. This calms the flow in this region, and simultaneously reduces the pressure loss occurring due to the separation device 119. Then, the fluid enters the second deflection region 131, which, in turn, has a reduced cross-section, in order to achieve an acceleration of the flow in this region. Then, after thus being cleansed, the fluid enters the inflow device 121 in order to there enter the control chamber through the valve member 107, the B2 line 112 via the control valve 105. As can be seen, in particular, in FIG. 5, which is a cross-sectional view from the direction B in FIG. 4, the blow-by that has been separated out in the separation device 119 is supplied back to the inflow device 121 via a discharge device 137 comprising a slope 135 in the connection line 127. Thus, the inflow device 121 also works at the same time as the discharge device. The blow-by that has been separated in the separation device flows therewith back into the region of the valve inlet and thus does not enter the interior of the valve 101, thereby increasing the failure safety.

Figure 6A:
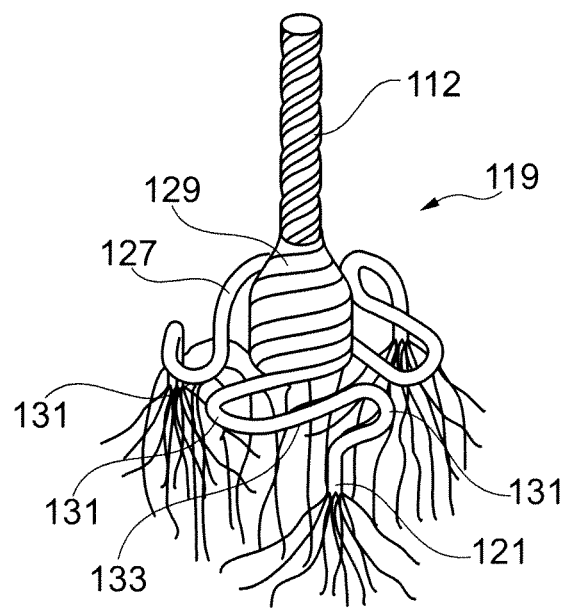
FIG. 6a illustrates a schematic view of a flow simulation of a fluid flow through the separation device or into the overrun air recirculation valve of FIGS. 2 to 5.
Figure 6B:
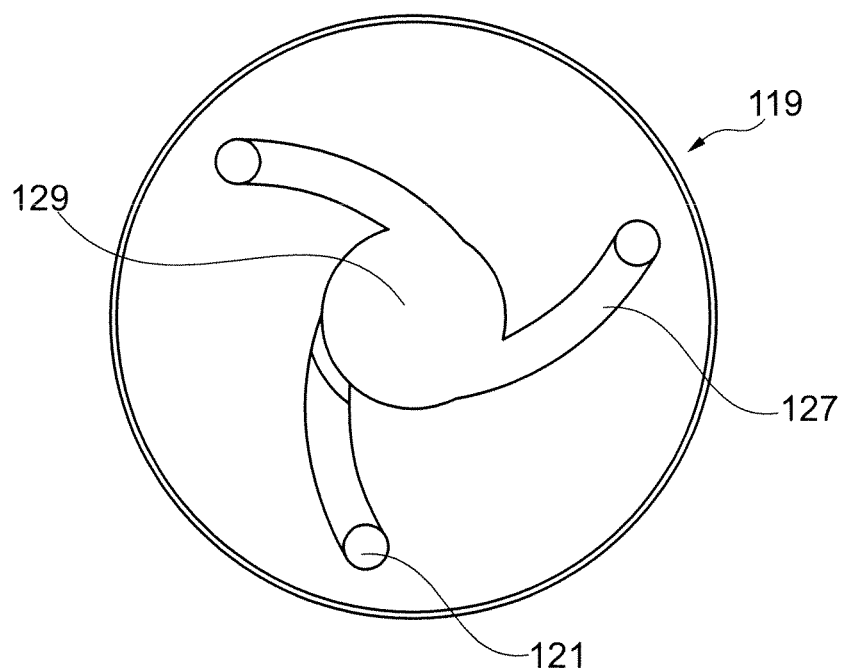
FIG. 6b illustrates a view of the separation device of FIG. 3, from a direction C.

FIG. 6a depicts a schematic representation of a simulation of flow of the fluid through the separation device and the B2 line 112. As can be seen in FIG. 6a, the fluid in the region of the separation device 119 flows at a maximum speed, in order to achieve the greatest possible separation out in the region of the separation device 119, in particular, the deflections 131. After passage through the separation device 119, the flow again loses speed. As can be seen in FIG. 6b, the fluid enters the outflow device 129 tangentially from the connection line 127. This, due to the alignment and shaping of the outflow device 129 in a circular direction, causes the fluid to be set into a rotational motion, producing—also in this region—further separation out of the stains due to the cyclone principle and the associated centrifugal forces, these stains then flowing into the outflow device 129 in order to be supplied through the separation device 119 back to the valve inlet.

Figure 7:
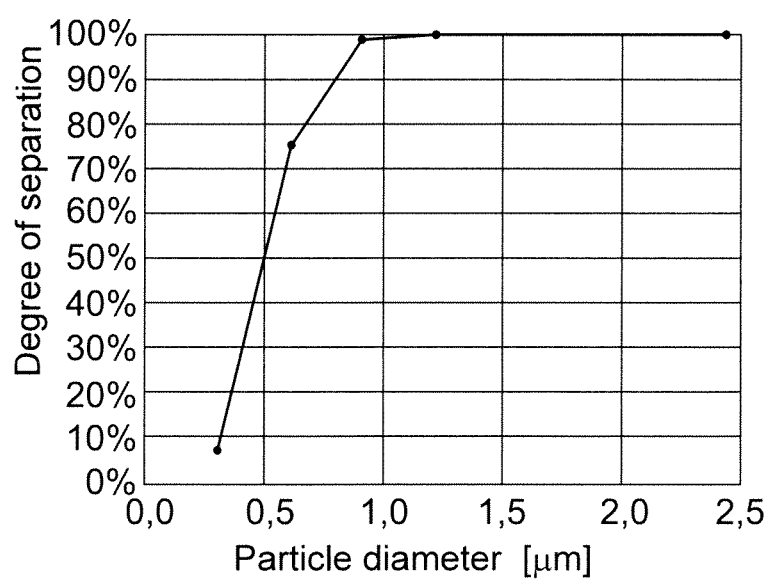
FIG. 7 illustrates a graphic plot of the degree of separation of the overrun air recirculation valve according to the present invention.

Finally, FIG. 7 depicts a graphical representation of the degree of separation of the separation device 119 over the particle diameter at a constant flow rate. As can be seen from the distribution, a separation out with a degree of separation of more than 98% takes place, in particular, for particles from a particle diameter of 0.9 μm.

The present invention thus provides a valve in which a separation device is integrated into a valve member or a piston of an overrun air recirculation valve in order to filter out or reduce the blow-by and other stains contained in the fluid before ingress thereof into the valve and, as a consequence of deposits in the interior of the valve, causes sooting or coking, with the risk of setting of moving parts of the valve. The separation device is especially advantageous in comparison to a filter system in that maintenance is avoided, because unlike with a filter the separation device need not be replaced or cleansed. In particular, the separation device comprises an insert that has one or more openings, as inflow devices, on the underside of the valve member, which is in contact with the inflowing medium or faces the valve seat. Then, the inflow devices may lie in different planes, and may also be arranged vertically as well as horizontally.

The features disclosed in the preceding description, in the drawings, and in the claims may be essential individually as well as in any combination for the embodiments in the various embodiments thereof.

LIST OF REFERENCE SIGNS 1, 101 Overrun air recirculation valve
3, 103 Pneumatic valve
5, 105 Control valve
7, 107 Valve member
9 Valve seat
11 Valve inlet
12, 112 B2 line
13 Control chamber
15 Spring element
17 Valve outlet
18, 118 Line
119 Separation device
121 Inflow device
123 Elevation
125 Intermediate region
127 Connection line
129 Outflow device
131 Deflection
133 Intermediate region
135 Slope
137 Discharge device
A, B, C Direction

The invention claimed is:

1. A method for controlling a flow in a valve, the method comprising:
controlling at least one first flow of fluid along a first fluid path from at least one valve inlet to at least one first valve outlet;
closing at least one valve seat at least in one region in at least one closed position by at least one valve member, wherein the at least one valve seat is arranged with respect to the at least one first fluid flow between the at least one valve inlet and the at least one valve outlet;
separating out stains present in the at least one first flow of fluid in at least in some regions in the at least one valve seat or the at least one valve member, wherein the separating out stains occurs in the at least one first flow of fluid in the at least one closed position along at least one second fluid path from the at least one valve inlet to at least one other valve device, wherein the at least one other valve device comprises at least one three-way valve or at least one solenoid valve.

2. The method of claim 1, wherein the at least one second fluid path runs at least in one region through the at least one valve member or the at least one valve seat.

3. The method of claim 1, wherein the at least one other valve device further comprises at least one valve chamber in at least one region.

4. The method of claim 1, wherein the separating is performed by a separation device that includes the at least one vale seat or the at least one valve member and includes the at least one valve inlet and the at least one other valve device for directing the fluid flow.

5. The method of claim 4, further comprising:
fixing the separation device by bonding, welding, clipping, latching, bolting, clamping, or positive and/or non-positive locking connection.

6. The method of claim 4, further comprising:
disposing the separation device at least in one region as at least one insert that can be accommodated at least in one region in the at least one valve seat or the at least one valve member.

7. The method of claim 4, wherein the separation device comprises at least one inflow device for the inflow of the fluid to be cleansed into the at least one separation device, at least one outflow device for the outflow of fluid that is cleansed from the fluid to be cleansed from the separation device, and at least one discharge device for discharging stains that have been separated out from the fluid to be cleansed, wherein the at least the inflow device and the at least one discharge device are configured at least in one region as a single piece.

8. The method of claim 7, wherein the separation device is arranged at least between the at least one inflow device and the at least one outflow device.

9. The method of claim 7, further comprising:
forcing a deflection on the fluid by at least one connection line, wherein the at least one connection line is disposed between the at least one inflow device and the at least one outflow device.

10. The method of claim 9, wherein the at least one connection line has different cross-sections or cross-sectional shapes, wherein the cross-section in a region of the deflection is reduced in comparison to a region upstream and downstream of the deflection, and wherein a change in the cross-section is continuous.

11. The method of claim 9, wherein the at least one discharge device comprises at least one discharge line that runs at least in one region inclined in a direction of gravity, the at least one discharge line is comprised by the at least one connection line, at least in one region, or the at least one discharge line is connected at least in one region to the at least one inflow device or to the at least one valve inlet.

12. The method of claim 7, further comprising:
opening, by the at least one inflow device, into the at least one outflow device.

13. The method of claim 4, wherein the separation device comprises at least one centrifugal separation device, at least one swirl separation device, at least one baffle plate separation device, at least one labyrinth separation device, or at least one cyclonic separation device.

14. The method of claim 1, further comprising:
surrounding the at least one inflow device at least in one region with at least one elevation.

15. A method for a valve controlling flow of a fluid in a motor vehicle, the method comprising:
receiving a fluid flow of the fluid from at least one valve inlet;
providing a first fluid path for the fluid flow from the at least one valve inlet to at least one valve outlet;
blocking the first fluid path by closing at least one valve seat that is arranged along the first fluid path between the at least one valve inlet and the at least one valve outlet;
separating stains from any of the fluid that is blocked in a second fluid path from the at least one valve inlet to at least one other valve device, wherein the at least one other valve device comprises at least one three-way valve or at least one solenoid valve.

* * * * *